(12) United States Patent
Miyashita (10) Patent No.: US 9,823,549 B1
(45) Date of Patent: Nov. 21, 2017

(54) LEVERED MOUNT ADAPTER

(71) Applicant: GoPro, Inc., San Mateo, CA (US)

(72) Inventor: Yusuke Miyashita, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/336,707

(22) Filed: Oct. 27, 2016

(51) Int. Cl.
*F16M 11/04* (2006.01)
*G03B 17/56* (2006.01)

(52) U.S. Cl.
CPC ......... *G03B 17/561* (2013.01); *F16M 11/041* (2013.01); *F16M 2200/024* (2013.01); *F16M 2200/028* (2013.01)

(58) Field of Classification Search
CPC ............................. G03B 17/561; F16M 11/041
USPC ........................... 396/419–428; 348/373–376
See application file for complete search history.

(56) References Cited

U.S. PATENT DOCUMENTS

2005/0041966 A1* 2/2005 Johnson ............... F16M 11/041
396/428

* cited by examiner

*Primary Examiner* — Rochelle-Ann J Blackman
(74) *Attorney, Agent, or Firm* — Fenwick & West LLP (57) ABSTRACT

The levered mount adapter couples with a camera system to stabilize and enable the camera system to capture high quality images. The levered mount adapter includes a fingered base component, a first lever, and a second lever, which altogether, are designed to couple with extensions of the camera system. A user may decouple the camera system from the levered mount adapter by providing a force input on input structures located on the levered mount adapter. In doing so, the applied force rotates the lever components of the levered mount adapter, thereby eliminating their coupling with extensions of the camera system and enabling the convenient removal of the camera system.

20 Claims, 5 Drawing Sheets

LEVERED MOUNT ADAPTER

TECHNICAL FIELD

This disclosure relates to camera mount adapters, more specifically, to a levered mount adapter including a pivot configuration for coupling with a camera system.

BACKGROUND

Digital cameras are often used to capture pictures or videos in a variety of settings such as in outdoor and sports environments. Camera mount adapters are often coupled to a camera system to stabilize the camera system. Once a camera system is coupled to a mount adapter, it may be difficult to change the orientation of the camera. Therefore, it may be desirable to rapidly decouple the camera system from the camera mount adapter. However, current mount adapters are cumbersome and require significant manual input from a user in order to release the camera system from the mount adapter.

BRIEF DESCRIPTIONS OF THE DRAWINGS

The disclosed embodiments have other advantages and features which will be more readily apparent from the following detailed description and the appended claims, when taken in conjunction with the accompanying drawings, in which:

Figure (FIG.) 1 depicts the levered mount adapter coupled with a camera system, according to one example embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed is a levered mount adapter that may be configured to stabilize a mounted camera. By way of example, at least a portion of the levered mount adapter couples with an object such as a camera frame that is structured to at least partially enclose a camera. The camera and camera frame are hereafter referred to together as a camera system. The levered mount adapter may be further configured to receive a user provided force input that releases the camera frame from the portion of the levered mount adapter. Thus, a user can rapidly couple and decouple the camera frame from the levered mount adapter.

A levered mount adapter may include multiple components that enable the levered mount adapter to couple with a camera frame of a camera system. In various embodiments, the levered mount adapter may include a fingered base component, a first lever, a second lever, and multiple tension elements. The fingered base may have a center raised member, and additionally a first and second member located on either side of the center raised member that are each configured to couple with extensions from a camera frame of a camera system.

The first and second lever may each be coupled to the fingered base component via pivot points that enable each lever to rotate around their respective pivot points. The first and second lever may reside in a resting configuration where the first lever and second lever are each coupled with an extension of a camera frame. When a user wishes to decouple the camera system from the levered mount adapter, the user may provide a force input on each end of the first lever and second lever to cause them to rotate around their respective pivot points, thereby decoupling the first and second levers from the extensions of the camera frame. Therefore, a user can easily decide to mount or dismount a camera system from a levered mount adapter at his/her discretion.

Example Camera System Coupled to a Levered Mount Adapter

Figure 1:
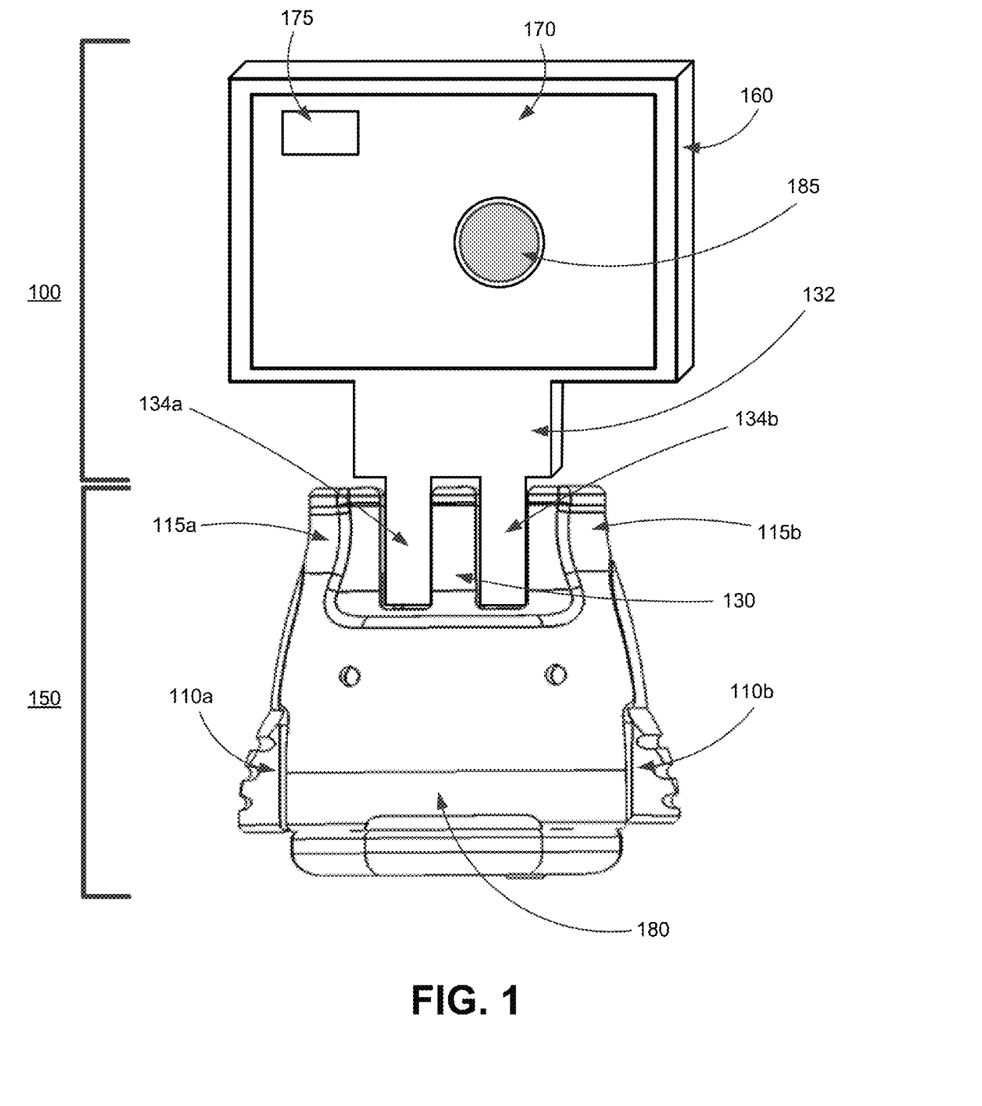

Figure (FIG.) 1 and the other figures use like reference numerals to identify like elements. A letter after a reference numeral, such as "134a," indicates that the text refers specifically to the element having that particular reference numeral. A reference numeral in the text without a following letter, such as "134," refers to any or all of the elements in the figures bearing that reference numeral (e.g. "134" in the text refers to reference numerals "134a" and/or "134b" in the figures).

Referring now to FIG. 1, it shows a levered mount adapter 150 coupled with a camera system 100, according to one example embodiment. In various embodiments, the levered mount adapter 150 may include a fingered base 180 that may further include a center raised member 130, a first member 115a, and a second member 115b, each located at the top of the fingered base 180. Additionally, the levered mount adapter 150 may include a first lever 110a and a second lever 110b. The camera system 100 may include a camera frame 160, a camera 170, a securing structure 132 of the camera frame 160, and multiple extensions 134a and 134b of the securing structure 132.

In various embodiments, the camera 170 is substantially enclosed by the camera frame 160. The camera 170 includes a camera body having a camera lens 185 structured on a front surface of the camera body. The camera 170 may include various other components, for example, a light emitting diode 175 on the front of the surface of the camera body. In one embodiment, the camera frame 160 includes one or more securing structures 132 for securing the camera frame 160 to one of a variety of mounting adapters. For example, FIG. 1 illustrates the camera frame 160 with multiple extensions 134 configured to couple with individual components of the levered mount adapter 150.

In various embodiments, the first member 115a, second member 115b, and center raised member 130 of the fingered base 180 are parallel to one and protrude upward from the fingered base 180. The first member 115a and the center raised member 130 may be separated by a distance. Therefore, the distance between the first member 115a and the center raised member 130 forms a first cavity within the fingered base 180. Additionally, the second member 115b and the center raised member 130 may also be separated by a distance. The distance similarly forms a second cavity within the fingered base 180.

In various embodiments, the first member 115a, the second member 115b, and the center raised member 130 of the fingered base are configured to couple with the extensions 134 of the camera frame. For example, the first cavity formed between the first member 115a and the center raised member 130 may be configured to receive a first extension 134a of the camera frame. Similarly, the second cavity formed between the second member 115b and the center raised member 130 may be configured to receive a second extension 134b of the camera frame. As depicted in FIG. 1, the first extension 134a sits within the first cavity and is in contact with the first member 115a and the center raised member 130. The second extension 134b sits within the second cavity and is in contact with the second raised member 115b and the center raised member 130.

One skilled in the art may appreciate that although FIG. 1 depicts a single center raised member 130, in various embodiments, there may be more or less than one center raised member 130 depending on the design of the extensions 134 of the camera frame 160. For example, the camera frame 160 may have three extensions 134. Therefore, the fingered base 180 may have two center raised members 130 to couple with the three extensions 134 of the camera frame 160. In another embodiment, the camera frame 160 may only have one extension 134. Therefore, the fingered base 180 may have a first member 115a and a second member 115b without a center raised member.

When coupled with the components of the fingered base 180, the camera frame 160 (and the camera system 100) is withheld from vertical, horizontal, and rotational displacement relative to the levered mount adapter 150. In various embodiments, the coupling between the components of the fingered base 180 and the extensions 134 of the camera frame 160 is a mechanical coupling that occurs within the fingered base 180. Coupling of the extensions 134 of the camera frame 160 and the levered mount adapter 150 is further discussed below.

Components of the Levered Mount Adapter

Figure 2:
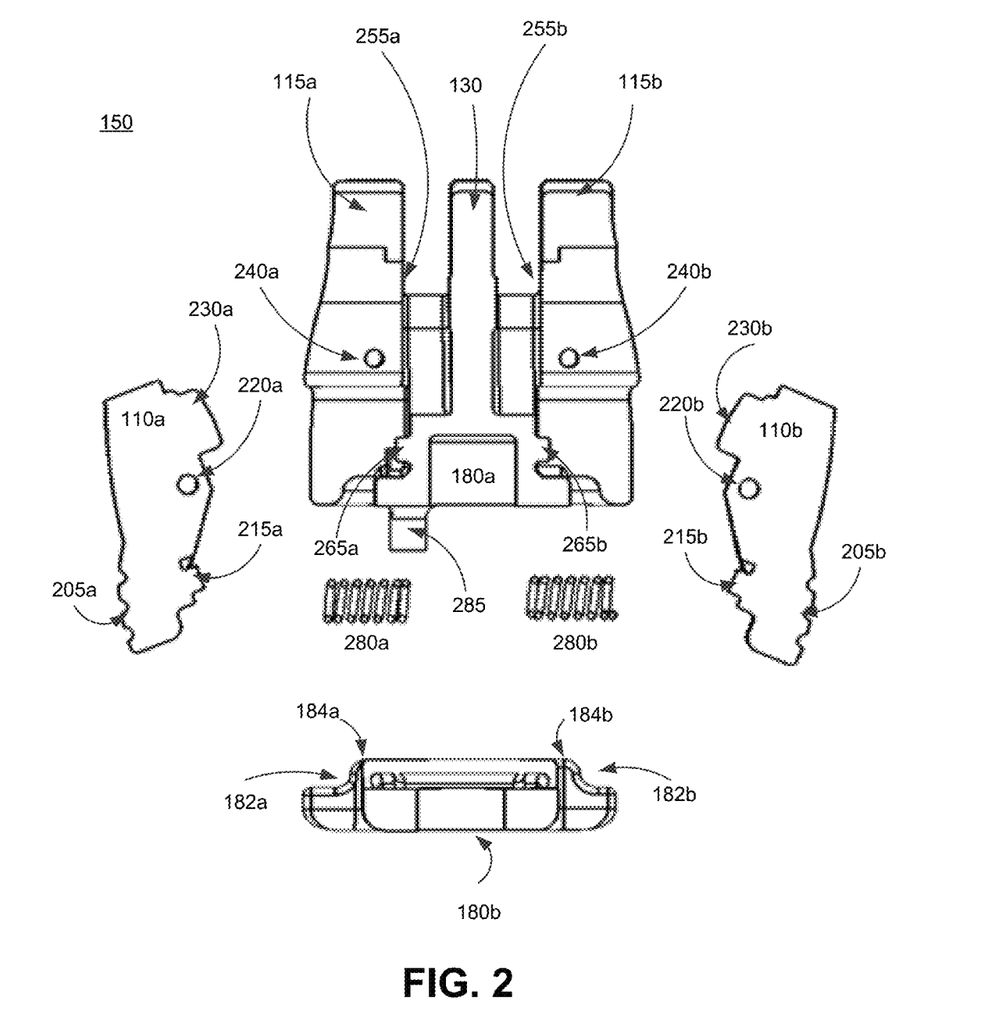
FIG. 2 illustrates an exploded view of a cross-section of the individual components in the levered mount adapter, according to one example embodiment.

FIG. 2 illustrates an exploded view of a cross-section of the individual components of the levered mount adapter 150, according to one example embodiment. In addition to the aforementioned components of the levered mount adapter 150, the levered mount adapter 150 may further include multiple tension elements 280a and 280b. Additionally, the fingered base 180 may be further divided into a top fingered base 180a component and a bottom fingered base 180b component that enables the levered mount adapter 150 to stably sit on a flat surface.

The top fingered base 180a may include the previously mentioned first member 115a, second member 115b, and center raised member 130, each of which may be located at the top of the top fingered base 180a. The top fingered base 180a may further include a first opening 255a, a second opening 255b, a first coupling point 240a, a second coupling point 240b, a first protrusion 265a, and a second protrusion 265b. The first lever 110a and second lever 110b may be designed similarly. For example, each lever may include a first end with a ramp detent 230a and 230b, a second end that includes an input structure 205a and 205b and a structural extension 215a and 215b, and a pivot point 220a and 220b located between the first end and second end of the lever.

Figure 3A:
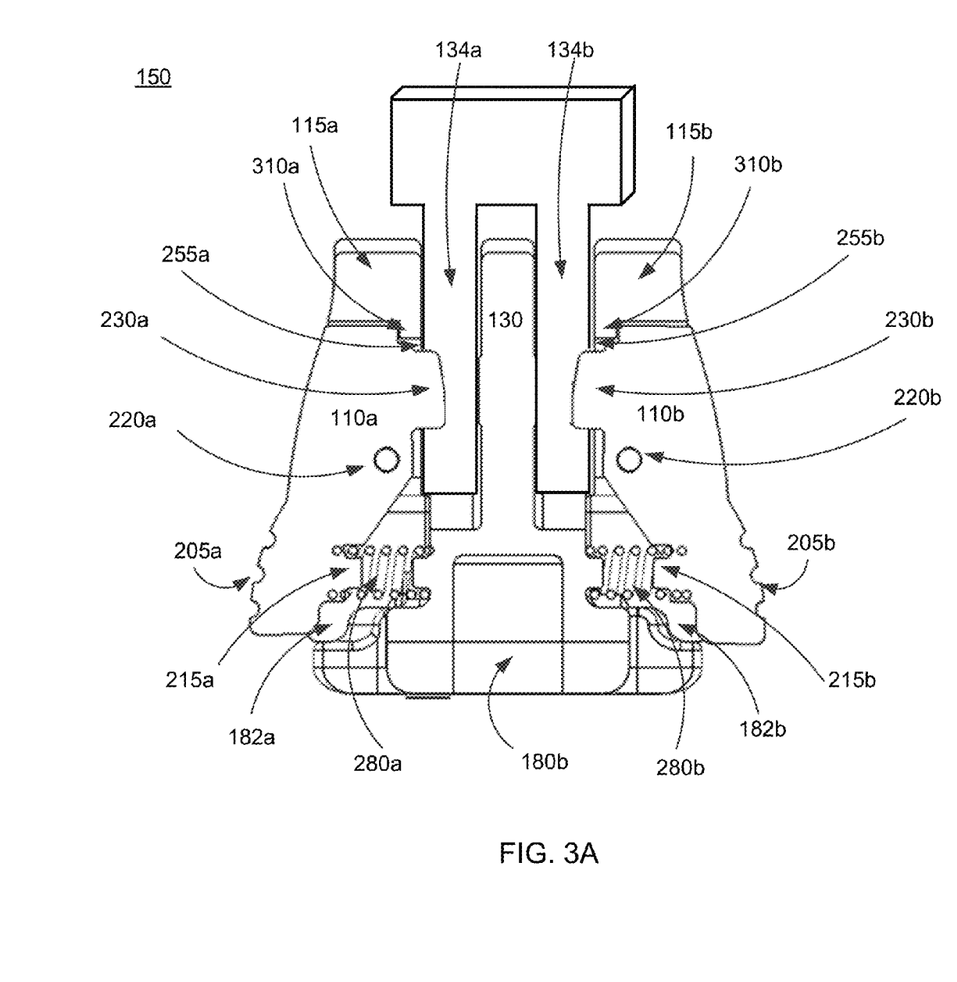
FIG. 3A illustrates a cross-section of the levered mount adapter in a resting configuration, according to one example embodiment.

Further reference will also be made in regards to FIG. 3A which illustrates a cross-section of the assembled levered mount adapter in a resting configuration, according to one example embodiment. FIG. 3A further depicts the first member 115a and second member 115b of the fingered base component 180 that may each further include a lip 310a and 310b that interfaces with a portion of the first lever 110a and second lever 110b respectively.

Referring to FIG. 2, the first lever 110a and second lever 110b may each couple with the top fingered base 180a component. In various embodiments, the pivot point 220a of the first lever 110a is rotatably coupled with the coupling point 240a of the top fingered base 180a. Similarly the pivot point 220b of the second lever 110a is rotatably coupled with the coupling point 240b of the top fingered base 180a. Therefore, the first lever 110a and second lever 110b are each able to rotate in a clockwise or counter-clockwise fashion around their respective pivot point 220a and 220b relative to the top fingered base 180a component.

As depicted in FIG. 2, the first member 115a and the second member 115b of the top fingered base 180a may each have a first opening 255a and a second opening 255b, respectively. The first opening 255a and second opening 255b may each be facing towards the center raised member 130 of the top fingered base 180a. When the first lever 110a and second lever 110b are each rotatably coupled to the top fingered base 180a through their respective pivot point 220a and 220b, the ramp detent 230a and 230b of each lever enters through the first opening 255a and second opening 255b, respectively. Referring to FIG. 3A, the ramp detent 230a of the first lever 110a may couple with a first extension 134a of the camera frame and the ramp detent 230b of the second lever 110b may couple with a second extension 134b of the camera frame. In various embodiments, each extension 134 of the camera frame may have a reciprocal cavity that is configured to receive each ramp detent 230a and 230b. In this resting configuration where the levered mount adapter 150 is coupled to the camera frame 160, the ramp detent 230a of the first lever 110a and the ramp detent 230b of the second lever 110b prevent the extensions 134a of the camera frame 160 from moving horizontally, vertically, or rotationally relative to the levered mount adapter.

In various embodiments, each ramp detent 230a and 230b may be designed with a surface composed of a substance that increases the coefficient of friction between each ramp detent 230a and 230b and the extensions 134a and 134b of the camera frame 160. This further ensures that the levered mount adapter 150 and the camera frame 160 are firmly coupled to prevent any lateral, vertical, or rotational displacement of the camera frame 160 relative to the levered mount adapter 150. For example, the substance on the surface of each ramp detent 230a and 230b may be an elastomer or a different polymeric compound. The substance may be coated on the surface of the ramp detent or each ramp detent may be entirely composed of the sub stance.

The position and orientation of the first lever 110a and second lever 110b relative to the top fingered base 180a component in the resting configuration may be determined by the structural extension 215a and 215b of each lever and a respective tension element 280a and 280b. For example, the structural extension 215a and 215b may be configured to interface with one end of the first tension element 280a and second tension element 280b, respectively. The other end of each tension element 280a and 280b is configured to interface with a protrusion 265a and 265b of the top fingered base 180a. In various embodiments, the diameter of each structural element 215a and 215b may be designed to be smaller than the inner diameter of each tension element 280a and 280b such that the tension element 280a and 280b may couple with the respective structural extension 215a and 215b. Similarly, the diameter of each protrusion 265a and 265b may be designed to be smaller than the inner diameter of each tension element 280a and 280b such that the tension element 280a and 280b may couple with the respective protrusion 265a and 265b. When in the resting configuration, the tension element 280a and 280b may be neither in tension nor in compression and may have a resting length. Therefore, the resting configuration of the first lever 110a and second lever 110b is dependent on the resting length of each tension element 280a and 280b.

In other example embodiments, the resting configuration of the first lever 110a and second lever 110b is dependent on their respective tension elements 280a and 280b as well as a lip 310a and 310b, as depicted in FIG. 3A, located on the first member 115a and second member 115b, respectively. For example, the tension element 280a may be in compression and may force the first end of the first lever 110a, including the ramp detent 230a, through the opening 255a of the first member 115a. The tension element 280b may also be in compression and may force the first end of the second lever 110b, including the ramp detent 230b, through the opening 255b of the second member 115b. The lip 310a on the first member 115a and the lip 310b on the second member 115b may set the maximum rotation of the first lever 110a and second lever 110b. For example, the lip 310a on the first member 115a may be in contact with the first lever 110a such that the lip 310a prevents the first lever 110a from further rotation in a clockwise direction around its pivot point 220a. Similarly, the lip 310b on the second member 115b may be in contact with the second lever 110b such that the lip 310b prevents the second lever 110b from further rotation in a counter-clockwise direction around its pivot point 220b.

Therefore, in the resting configuration, the first lever 110a and second lever 110b may each experience a balance of torques. Namely, the first lever 110a experiences a clockwise torque around its pivot point 220a exerted by the tension element 280a as well as an equal, counter-clockwise torque around its pivot point 220a exerted by the lip 310a. Similarly, the second lever 110b may experience a counter-clockwise torque around its pivot point 220b exerted by the tension element 280b as well as an equal, clockwise torque around its pivot point 220b exerted by the lip 310b.

Referring back to FIG. 2, the input structure 205a of the first lever 110a and the input structure 205b of the second lever 210b may each be designed to receive a user-provided input. In various embodiments, the input structures 205a and 205b may each have a tactile design that differentiates the input structures 205a and 205b from other regions of the levered mount adapter 150. For example, the input structures 205a and 205b may each have a ribbed design whereas the external surface of the levered mount adapter 150 may be smooth. The ribbed design may provide tactile feedback to a user such that the user can readily recognize the presence of the input structures 205a and 205b through physical contact.

As previously stated, the fingered base component 180 may include a top fingered base component 180a and a bottom fingered base component 180b. The top fingered base component 180a may further include a lock 285 that protrudes from the underside of the top fingered base component 180a. The bottom fingered base component 180b may be further designed with recessed cavities 182a and 182b and elevated lips 184a and 184b. When the bottom 180b and top fingered base components 180a are assembled together, the bottom fingered base component 180b may rotate relative to the top fingered base component 180a to enter into a locked or unlocked state.

Figure 3B:
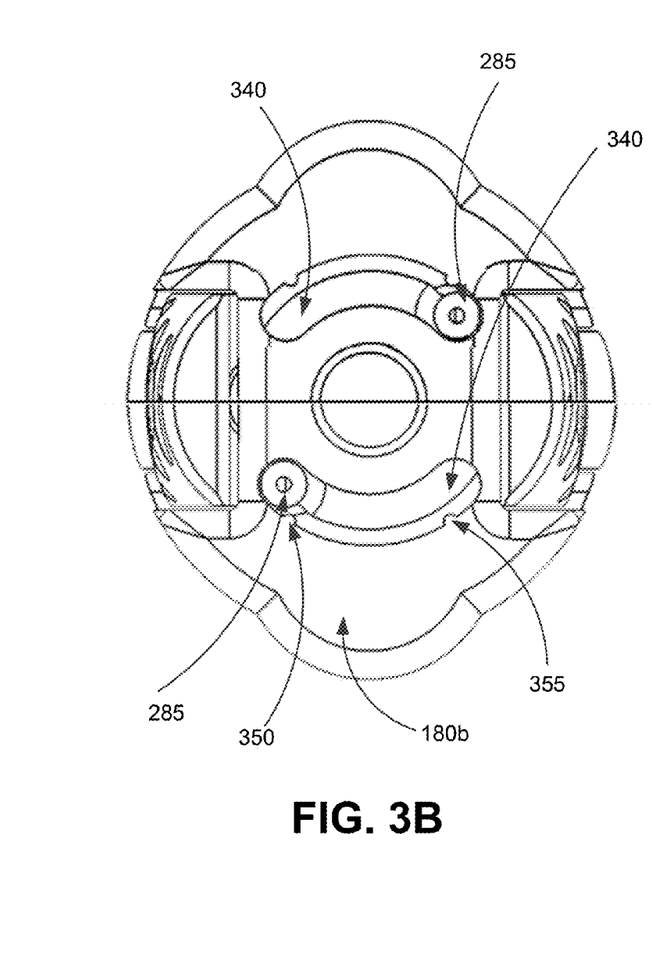
FIGS. 3B and 3C depict a bottom-view of the levered mount adapter in an unlocked and locked configuration, respectively, according to one example embodiment.

Turning to FIG. 3B, which depicts a bottom view of the full levered mount adapter 150, each lock 285 of the top fingered base component 180a enters into a path 340 of the bottom fingered base component 180b. As depicted in FIG. 3B, the locks 285 may be considered to be in an unlocked position.

Returning to FIG. 3A, when in the unlocked position, the bottom fingered base component 180b is aligned with the top fingered base component 180a such that the recessed cavities 182a and 182b of the bottom fingered base component 180b allow for the first lever 110a and second lever 110b to rotate around their respective pivot points 220a and 220b and enter into each recessed cavity 182a and 182b of the bottom fingered base component 180b. In other words, the recessed cavities 182a and 182b are oriented to allow for the first lever 110a and second lever 110b to compress the tension elements 280a and 280b and therefore, enable the release of the camera frame 160 from the levered mount adapter 150.

Figure 3C:
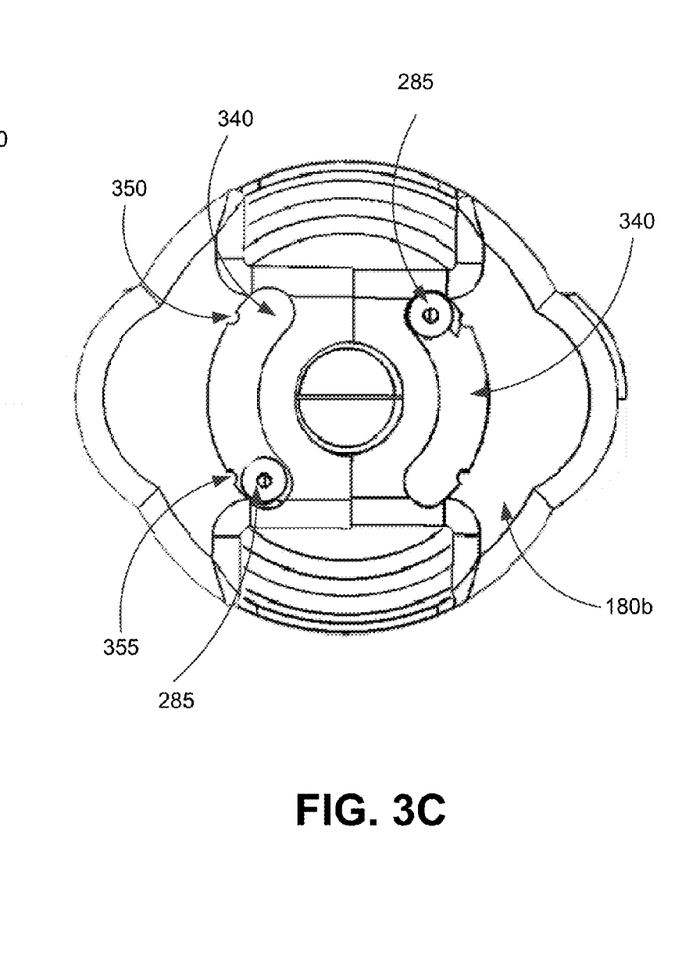

FIG. 3C depicts a bottom view of the full levered mount adapter 150 in a locked state. In various embodiments, a user may provide an input to rotate the bottom fingered base component 180b relative to the top fingered base component 180a. Specifically, in transitioning from the unlocked state in FIG. 3B to the locked state in FIG. 3C, the bottom fingered base component 180b may be rotated 90 degrees relative to the top fingered base component 180a. In this configuration, each lock 285 may now be engaged in a locked position. The lock 285 may be held in the locked position by a second lip 355 located along the path 340. Returning to FIG. 2, the first lever 110a and the second lever 110b may be locked in the resting configuration and are therefore unable to rotate around their respective pivot points 220a and 220b to decouple from the camera frame 160. More specifically, when the bottom fingered base component 180b is rotated relative to the top fingered base component 180a to engage in the locked position, each raised lip 184a and 184b of the bottom fingered base component 180b is oriented such that the first lever 110a and the end of the second lever 110b may be prevented from rotating around their respective pivot points 220a and 220b. For example, in the locked position the raised lips 184a and 184b may be in physical contact or in close physical contact to the end of the first lever 110a and end of the second lever 110b. Therefore, when a user input is provided on input structures 205a and 205b, the first lever 110a and second lever 110b may be unable to rotationally displace to the necessary extent that would allow the ramp detent 230a of the first lever 110a to retract from the first opening 255a and the ramp detent 230b of the second lever 110b to retract from the second opening 255b. This enables a user to prevent accidental decoupling of the camera frame 160 from the levered mount adapter 150.

Decoupling the Camera System from a Levered Mount Adapter

Figure 4:
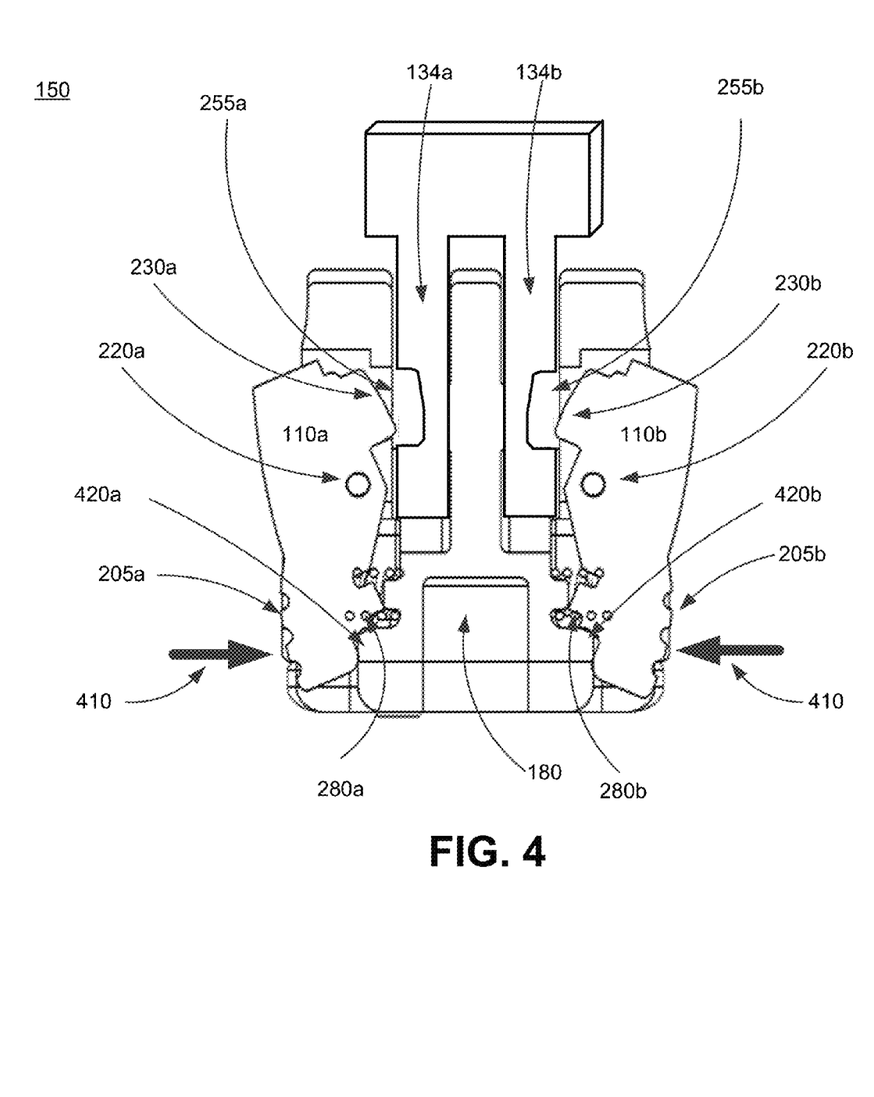
FIG. 4 illustrates a cross-section of the levered mount adapter in an open configuration after receiving a force input, according to one example embodiment.

FIG. 4 illustrates a cross-section of the levered mount adapter 150 in an open configuration after receiving a force input 410, according to one example embodiment. The force input 410 may cause the first lever 110a and second lever 110b to rotate to a first edge 420a and second edge 420b, respectively on the fingered base 180.

The force input 410 may be applied to the input structures 205a and 205b on the first lever 110a and second lever 110b, respectively and may cause the first lever 110a to rotate counter-clockwise around its pivot point 220a and the second lever 110b to rotate clockwise around its pivot point 220b. Therefore, an end of the first lever 110a and second lever 110b may each enter into the respective recessed cavity 182a and 182b on the bottom fingered base component 180b (see FIG. 2). Additionally, the force input 410 may cause the tension elements 280a and 280b to be compressed (e.g., in a state of compression). The maximal rotation of the first lever 110a and second lever 110b may be limited by the first edge 420a and second edge 420b, respectively, located on the fingered base 180. For example, the first lever 110a and second lever 110b may rotate around their respective pivot points 220a and 220b until they physically contact the first edge 420a and second edge 420b. The various embodiments, the first edge 420a and second edge 420b are designed such that the maximum rotation of the first lever 110a may enable the ramp detent 230a of the first lever 110a to retract from the first opening 255a and the ramp detent 230b of the second lever 110b to retract from the second opening 255b. In doing so, the ramp detents 230a and 230b may decouple from the reciprocal cavity or hole located on the extensions 134a and 134b of the camera frame 160, thereby enabling the camera frame 160 to decouple from the levered mount adapter 150.

In various embodiments, if application of the force input 410 is ceased, the levered mount adapter 150 reverts from the open configuration, as illustrated in FIG. 4, back to the resting configuration, as depicted in FIG. 3. The return to the resting configuration may be caused by the forces exerted by the compressed tension elements 280a and 280b to rotate the first lever 110a in a clockwise fashion and to rotate the second lever 110b in a counter-clockwise fashion.

Additional Configuration Considerations

The disclosed embodiments of the levered mount adapter provide advantages over conventional camera mount adapters. The levered mount adapter is configured to enable a user to conveniently couple a camera to the spring mount adapter. Once coupled, the levered mount adapter effectively stabilizes the position of the camera by ensuring that the camera is unable to directionally or rotationally displace relative to the levered mount adapter. Additionally, a user of the levered mount adapter can rapidly decouple the camera from the levered mount adapter by providing a user input. This enables the user to easily gain access to the camera without the levered mount adapter if he/she desires.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for smart frames as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A levered mount adapter comprising:
   a three fingered base having a center raised member, a first member and a second member, the first member having an opening facing the center raised member and the second member having an opening facing the center raised member;
   a first lever having a first end, a second end, and a pivot point, the first end having a ramp detent, the pivot point located between the first end and the second end and coupled to the first member of the three fingered base, the second end comprising a structural extension coupled with a first tension element to force the first end having the ramp detent through the opening of the first member; and
   a second lever having a first end, a second end, and a pivot point, the first end having a ramp detent, the pivot point located between the first end and the second end and coupled to the second member of the three fingered base, the second end comprising a structural extension coupled with a second tension element to force the first end having the ramp detent through the opening of the first member.

2. The levered mount adapter of claim 1, wherein the three fingered base further comprises a lock that, when engaged in a locked position, prevents the ramp detent of the first lever from exiting the opening of the first member and prevents the ramp detent of the second lever from exiting the opening of the second member.

3. The levered mount adapter of claim 1, wherein the center raised member and the first member are separated by a first cavity and the center raised member and the second member are separated by a second cavity, the first cavity and second cavity each designed to receive an extension from a camera system.

4. The levered mount adapter of claim 1, wherein the ramp detent of the first lever and the ramp detent of the second lever each couple with a reciprocal cavity on an extension of a camera frame in a resting configuration.

5. The levered mount adapter of claim 1, wherein the second end of the first lever and the second end of the second lever each further comprise an input structure designed to receive a force input.

6. The levered mount adapter of claim 5, wherein the received force input on the input structures of the first lever and second lever causes the first lever and second lever to rotate around their respective pivot points.

7. The levered mount adapter of claim 6, wherein the first lever rotates around its pivot point in a counter-clockwise fashion and the second lever rotates around its pivot point in a clockwise fashion.

8. The levered mount adapter of claim 5, wherein the received force input causes the first tension element and the second tension element to be in compression.

9. The levered mount adapter of claim 5, wherein the first tension element and the second tension element return the first lever and second lever, respectively, back to a resting configuration following cessation of the received force input.

10. The levered mount adapter of claim 5, wherein the input structure designed to receive a user input on the second end of the first lever and the input structure designed to receive a user input on the second end of the second lever comprise a ribbed design that provides tactile feedback to a user.

11. A levered mount adapter comprising:
  a base component having a first member and a second member, the first member having an opening facing the second member,
  a lever having a first end, a second end, and a pivot point, the first end having a ramp detent, the pivot point located between the first end and the second end and coupled to the first member of the base component, the second end comprising a structural extension coupled with a tension element, the tension element forcing rotation of the lever around the pivot point and entering the first end having the ramp detent through the opening of the first member.

12. The levered mount adapter of claim 11, wherein the base component further comprises a lock that, when engaged in a locked position, prevents the ramp detent of the lever from exiting the opening of the first member.

13. The levered mount adapter of claim 11, wherein the first member and second member are separated by a cavity designed to receive an extension from a camera frame.

14. The levered mount adapter of claim 11, wherein the ramp detent of the lever couples with a reciprocal cavity on an extension of a camera frame in a resting configuration.

15. The levered mount adapter of claim 14, wherein in the resting configuration, the levered mount adapter prevents the camera frame from moving horizontally, vertically, or rotationally relative to the levered mount adapter.

16. The levered mount adapter of claim 11, wherein the second end of the lever further comprises an input structure designed to receive a force input.

17. The levered mount adapter of claim 16, wherein the received force input causes the lever to rotate around the pivot point of the lever.

18. The levered mount adapter of claim 16, wherein the received force input causes the tension element to be in compression.

19. The levered mount adapter of claim 16, wherein the tension element returns the lever back to a resting configuration following cessation of the received force input.

20. The levered mount adapter of claim 16, wherein the input structure designed to receive a user input on the second end of the first lever comprises a ribbed design that provides tactile feedback to a user.

* * * * *